United States Patent [19]

Pettigrew

[11] Patent Number: 5,018,069
[45] Date of Patent: May 21, 1991

[54] REFERENCE SYSTEM AND METHOD FOR DIAGNOSING AIRCRAFT ENGINE CONDITIONS

[75] Inventor: James L. Pettigrew, Fort Worth, Tex.

[73] Assignee: Howell Instruments, Inc., Fort Worth, Tex.

[21] Appl. No.: 379,220

[22] Filed: Jul. 13, 1989

[51] Int. Cl.⁵ .............................................. G06F 15/20
[52] U.S. Cl. ............................ 364/424.04; 364/551.01; 364/554; 364/431.01
[58] Field of Search ..................... 364/424.01, 424.03, 364/424.04, 431.01, 551.01, 508, 554; 73/117.2

[56] References Cited

U.S. PATENT DOCUMENTS

| | | | |
|---|---|---|---|
| Re. 31,750 | 11/1984 | Morrow | 364/508 |
| 4,215,412 | 7/1980 | Bernier et al. | 364/551.01 |
| 4,280,185 | 7/1981 | Martin | 364/431.01 |
| 4,402,054 | 8/1983 | Osborne et al. | 364/554 |
| 4,656,585 | 4/1987 | Stephenson | 364/424.04 |
| 4,660,145 | 4/1987 | Hansen | 364/424.04 |

Primary Examiner—Thomas G. Black
Attorney, Agent, or Firm—Cushman, Darby & Cushman

[57] ABSTRACT

An aircraft engine diagnostic apparatus is described. The diagnostic apparatus senses engine performance related parameters refers the data to a standard atmosphere condition and plots values relating to the functions of each engine performance related parameter with respect to other engine performance related parameters. The apparatus compares these actual engine operating parameter values with standard baselines for normal engines and calculates the deviation between the actual curve and the standard curve as referred engine diagnostic data (REDD), an indicator of engine performance condition. The apparatus also senses the direction of deviation of the changing engine parameters from the standard baseline as an additional diagnostic indicator of the probable cause of engine deterioration. The deviation values are then instantaneously provided for immediate diagnosis of engine condition. A method of using the apparatus to diagnose engine problems is also described.

29 Claims, 4 Drawing Sheets

REFERENCE SYSTEM AND METHOD FOR DIAGNOSING AIRCRAFT ENGINE CONDITIONS

FIELD OF THE INVENTION

This invention relates to the field of aircraft turbine engine condition monitoring and particularly to performance testing with methods for troubleshooting and diagnosing installed turbine engines.

BACKGROUND OF THE INVENTION

Aircraft engine monitors for sensing and displaying various aircraft turbine engine performance related parameters are well known. Traditionally, the aircraft pilot was expected to monitor and record these parameters as they appeared on the cockpit instruments to determine when the parameter values exceeded predetermined limits. These records made by the aircrews were later reviewed by ground personnel to diagnose the condition of the aircraft turbine engine and to predict possible engine failures.

Aircrews normally monitored the cockpit instruments during starts, operation, and controlled maintenance tests. Aircrews may err in recording cockpit instrument values and fail to detect subtle changes in the cockpit instruments especially at low engine power. Aircrew monitoring is less effective in other than controlled conditions, such as at less than maximum rated power, since the pilot had no reference from which to detect the subtle changes in performance parameters. Aircrews had to have particular knowledge of the sophisticated operation of the turbine engine and the significance of the changes in the turbine engine performance parameters with respect to engine operation to be able to recognize which value changes were critical to diagnosing the engine performance. Further, even if the parameter values were accurately recorded, ground maintenance crews using the recorded parameters to diagnose the engine condition required keen knowledge of the operation of the turbine engine to interpret the recorded parameters during their engine performance diagnosis. The maintenance crews erred, if at all, on the side of safety by authorizing the complete overall of an engine when the pilots recorded unusual or out-of-limit parameter values. While this resulted in few engine failures, the extra caution often resulted in the unnecessary removal of good components during the overhaul of engines requiring minor or no repairs rather than a complete overhaul.

The traditional methods of recording engine performance parameters was thus incomplete and error prone and the traditional method of engine diagnosis and maintenance was overly cautious and costly.

Known electronic monitors of engine parameters, such as the Portable Engine Analyzer Test Set (PEATS) manufactured by Howell, Instruments, U.S. Ser. No. 036,903, now abandoned do provide memory and display of current aircraft performance parameter values. These monitors may be used in conjunction with manufacturers' lists identifying permissible individual parameter values at the maximum rated engine power to provide an indication of engine condition. The PEATS disclosed in U.S. Ser. No. 036,903 does not, however, allow the pilot and maintenance crews to instantaneously obtain a diagnostic value immediately indicative of engine condition while in flight or while operating at less than maximum power.

SUMMARY OF THE INVENTION

In order to overcome the disadvantages of traditional aircraft engine diagnostics, the present invention provides an improved reference system and method for troubleshooting and diagnosing installed turbine engines.

In contrast to the traditional method of diagnosing engine conditions and predicting engine failures by visual monitoring and later diagnosis, the present invention provides continuous engine performance parameter sensing and instantaneous computation of diagnostic indicators at engine powers which may be less than the maximum rated engine power. The present invention has the ability to detect subtle changes in the sensed engine performance parameters at any operating speed, including idle, thus reducing human errors from interpreting and recording the analog instruments.

The present invention can provide a short, easily scanned, yet thorough record of engine behavior at any point in time in a referred engine diagnostic data (REDD) format. This allows maintenance personnel to make quick and accurate diagnostic judgments regarding the engine condition. In addition, the pilot can monitor in-flight engine performance by observing the display or printing the referred engine diagnostic data (REDD) indicators as they are calculated.

The present invention troubleshoots and diagnoses the turbine engine based on a logical analysis of the functional dependency between normal system operation and actual sensed engine performance parameters. Prior turbine engine diagnostic methods only used comparisons with limits at maximum power and required extensively trained maintenance personnel to guess the probable cause of performance parameter changes and determine engine prognosis. The reliability of this method was dependent upon the skill and ability of the maintenance personnel to accurately interpret the observed parameters in relation to engine performance. The present invention utilizes a new and improved method of rationally analyzing the relationship between performance parameter values and internal engine operation. This relationship is calculated and recorded in a small number of easily understandable diagnostic values.

The object of the present invention is to reduce the risk of engine failure through improved diagnostic analysis. This will avoid removal of good engine components during unnecessary overhauls of the turbine engine and allow an early detection of actual deterioration within the turbine engine, thus reducing secondary damage to additional components within the engine.

BRIEF DESCRIPTION OF THE DRAWINGS

These and other advantages of the present invention may be appreciated from studying the following detailed description of the presently preferred exemplary embodiment together with the drawings in which.

DETAILED DESCRIPTION OF THE PRESENTLY PREFERRED EXEMPLARY EMBODIMENT

The present invention is a diagnostic reference system for continually monitoring and reporting data reflecting the performance condition of a monitored turbine engine. The diagnostic analyzer indicates the extent of performance degradation in the turbine engine by outputting referred engine diagnostic data (REDD) values. These values indicate the extent of component wear, contamination and misadjustment within the turbine engine and provide a logical basis for determining the probable cause of the degradation. REDD values are a measure of the deviation between accepted engine parameter curves representing the functional relationships between various turbine engine performance parameters and actual engine parameter curves.

The reference system operates by sensing engine parameters and recording the relationships between each engine parameter with other engine parameters at the instantaneous engine power. It then records the functional relationship between each pair of parameters and compares them to standard baselines for engines known to be in good operating condition. It then displays the differences between the actual functions and the baselines to determine the extent and probable cause of the deterioration of the engine. The extent which engine deterioration has occurred is indicated by the degree of deviation between the actual function and the baseline. The probable cause of the deterioration is determined by identifying the particular functions which are excessively deviating from the corresponding baselines.

The various turbine engine performance parameters sensed by the diagnostic analyzer include, for example, fuel flow (FF), fuel pressure (FP), gas generator speed (NG), exhaust gas temperature (EGT), compressor discharge pressure (CDP), compressor discharge temperature (CDT) and torque pressure (Q). In addition to sensing these engine performance parameters, the diagnostic apparatus also senses external environmental conditions such as pressure altitude and ambient temperature. The diagnostic system then uses the external environmental parameters to refer/correct the sensed engine performance parameters to standard atmospheric conditions. The diagnostic apparatus then plots the function of each engine performance parameter with other engine performance parameters. For example, the diagnostic apparatus would plot the function of fuel flow (FF) versus fuel pressure (FP), fuel flow (FF) versus exhaust gas temperature (EGT), and so on.

The diagnostic apparatus may insert data into a standard personal computer which produces REDD or a test unit which is equipped with an on-board processor which uses a permanently recorded program to instantaneously compare the actual, calculated performance functions with stored, standard performance baselines representing engines in good condition. The standard baselines may be average performance curves recorded for the engine model or may be the calculated performance curves recorded for the particular engine when it was newly manufactured or after it was newly overhauled. The turbine engine will degrade at a predictable rate and the degree of degradation will be indicated by the deviation between the actual, calculated performance function and the standard, stored performance baseline. The REDD values are an indication of the degree of deviation between these actual functions and standard baselines.

Figure 1:
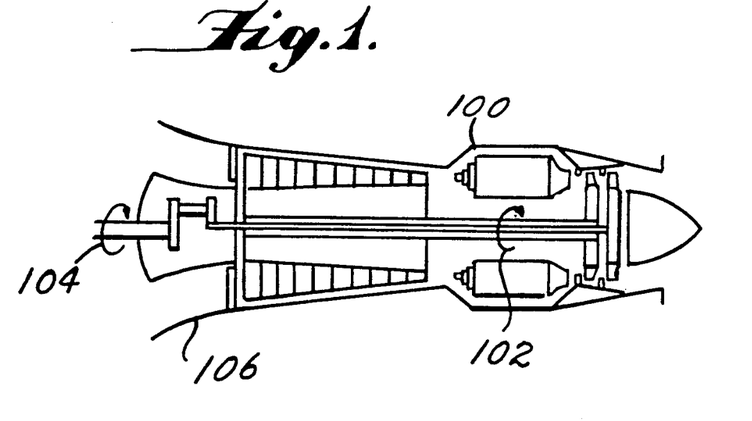
FIG. 1 is a schematic view of an aircraft turbine engine.

FIG. 1 illustrates a cross-sectional view of a turbine engine. The fuel flow 100, gas generator speed 102, torque 104, and exhaust gas temperature 106 sensing locations are shown. The diagnostic system may have independent sensors for detecting these parameters or the diagnostic analyzer may use an external sensing device such as the Portable Engine Analyzer Test Set (PEATS) manufactured by Howell Instruments, Inc. of Fort Worth, Tex. and described in U.S. patent application Ser. No. 07/036,903, incorporated into this application by reference.

Figure 2:
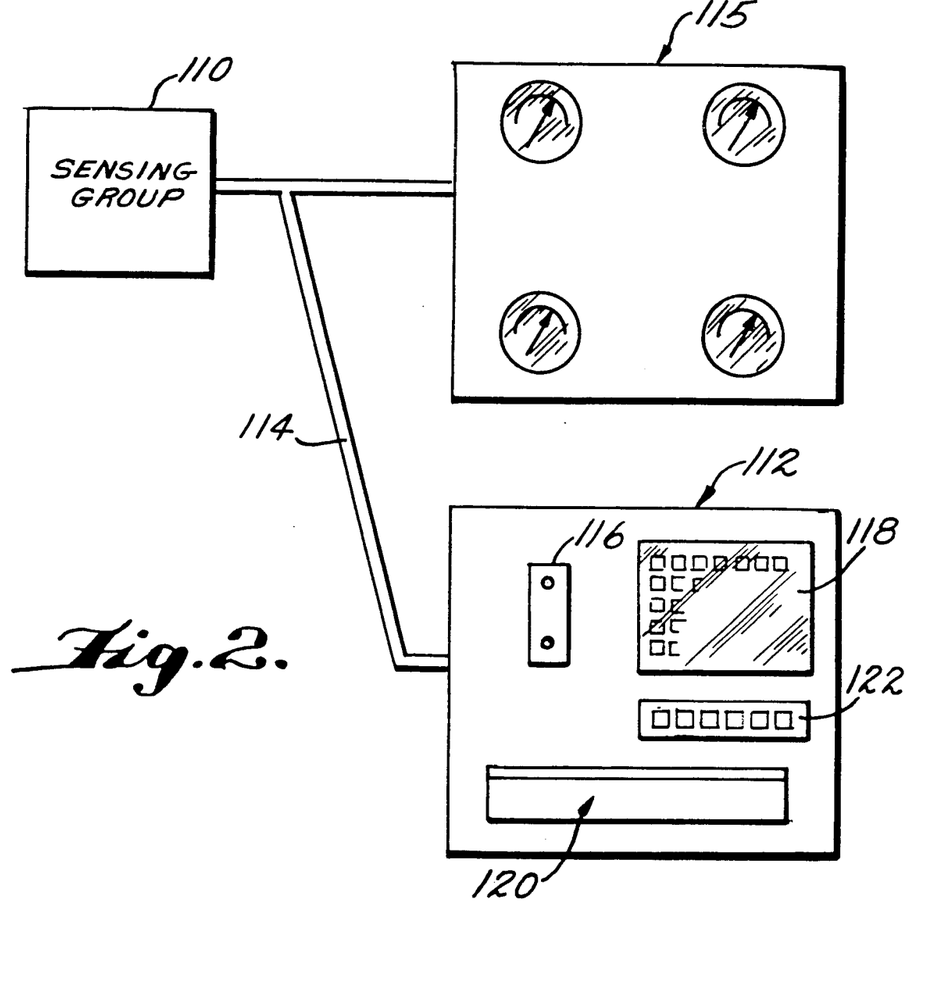
FIG. 2 is a schematic diagram of the present invention as installed in a typical aircraft.

FIG. 2 illustrates the diagnostic system 108 including sensors 110 and a processor 112. The sensors 110 include sensors for detecting the engine performance parameters and environmental sensors for detecting environmental conditions such as the pressure altitude and the ambient temperature. The processor 112 will use these environmental condition data to correct the engine parameter data to standard atmospheric conditions to normalize them before using them in calculations. Sensor signals are input to the cockpit instrument panel 115 where analog instruments indicate the parameter values to the aircrews. For the present invention, the sensor signals are tapped from the sensor-instrument panel transmission line 114, connecting the cockpit instrument panel 115 to the on-board sensors 110, into the processor 112. The processor 112 records the sensed parameters in real time and calculates the engine performance parameters as they would be at sea level, standard atmospheric condition.

The processor 112 includes a memory module 116 where the sensed parameter values are stored for future use. The removable memory module 116 may be removed from the processor 112 for transfer of flight recorded data to a ground computer database for detailed performance calculation of referred engine diagnostic data (REDD). The processor 112 may also include a display 118 for displaying any of the various engine performance parameters and calculated REDD values to the pilot while in flight. The processor 112 also includes a printer 120 allowing the pilot to make a permanent paper record while in-flight of sensed and calculated values. Switches 122 provide the aircrews with a means for selecting parameters and calculated values to be displayed on the display 118 or printed on the printer 120. The switches 122 also allow the pilot to identify which aircraft the diagnostic analyzer 108 is currently monitoring. This allows the diagnostic system 108 to be used in multiple aircraft prior to removal of the memory module 16 for ground diagnostics.

Figure 3:
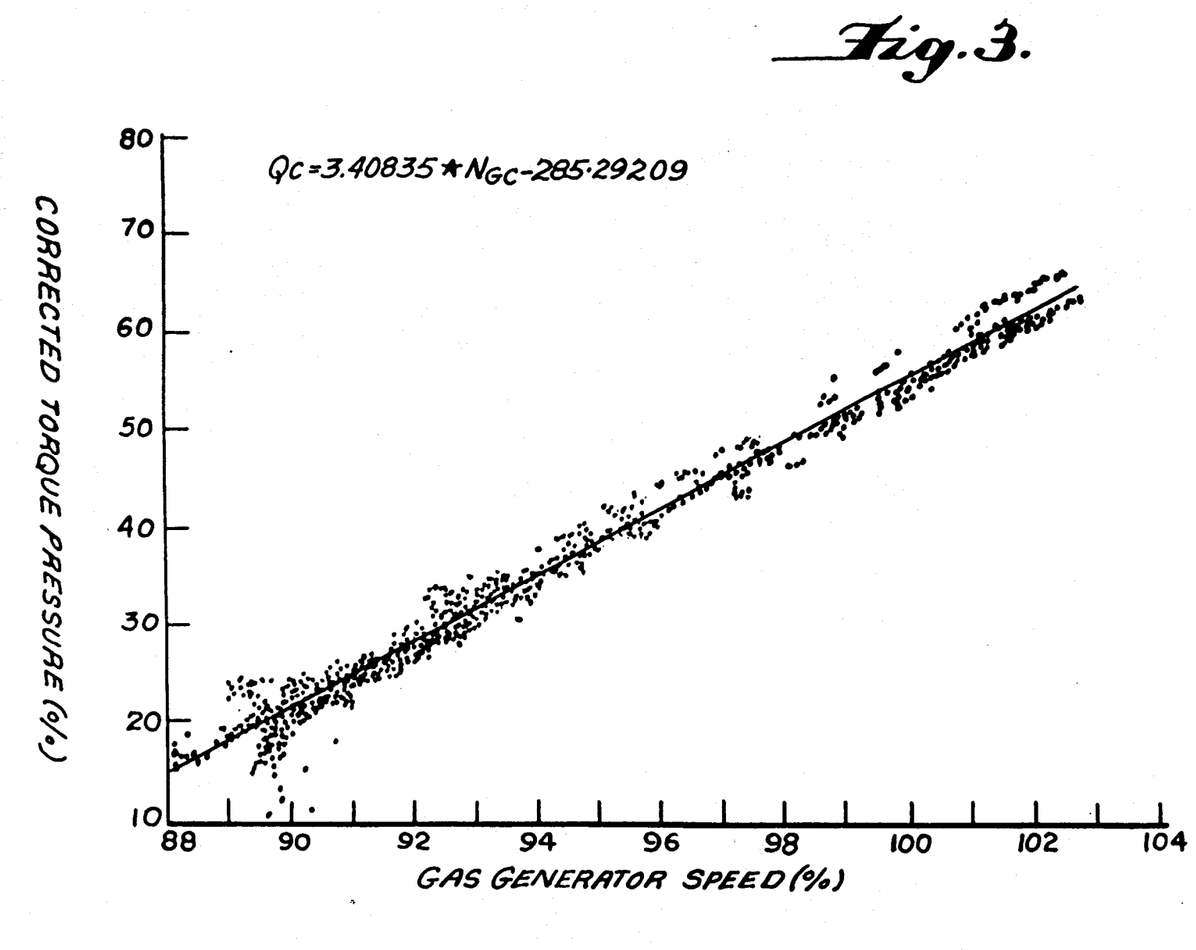
FIG. 3 is an exemplary baseline showing the functional relationship between two engine performance parameters for a particular engine model.

The processor 112 may contain performance curves representing the actual functions of each engine parameter with respect to every other engine parameter. FIG. 3 illustrates a standard performance baseline for a particular model engine for the function of corrected torque pressure (Qc) versus corrected gas generator speed (NGc). This particular baseline was calculated using actual values of five newly overhauled model engines. As indicated in FIG. 3, the torque pressure for the particular engine varies with respect to the gas generator speed for this particular engine model as:

$$Qc = 3.40835 \times Ngc - 285.29209$$

where Q is the torque pressure, Ng is the gas generator speed and the c following the engine performance parameters indicates that the parameter has been corrected to standard atmosphere, sea level conditions.

In operation, this standard baseline for an engine in good condition is stored in the program memory of the processor 112. The processor 112 then continually displays the actual relationship between corrected torque pressure and corrected gas generator speed, as sensed in the monitored engine, and then compares the calculated performance function for the monitored engine with the standard performance baseline shown on FIG. 3. The extent of deviation between the calculated function and the standard baseline is reflected in outputted referred engine diagnostic data, or REDD, values. This value increases as the actual performance functions increasingly deviate from the standard performance baselines, reflecting engine component deterioration. The process of comparing actual performance functions with standard performance baselines continues for each pair of sensed parameters.

The allowable deviations in REDD value for normal engine performance take into account the slight deviations between each manufactured engine within a model line and the allowable degradation in engine performance before maintenance is required. The normal operating bands for engine models are obtained by plotting a sample of curves representing the engine performance parameters as a function of every other engine performance parameter for a group of new or newly overhauled engines. The general width, or boundary, of the plotted curves for each of the sample of engines, establishes the limit values within which normal engine REDD should fall.

More particularly, the REDD values, identifying the deviations between the actual functions and the baselines may be drawn at locations $\pm 3$ standard deviations from the average curve (or "baseline") through the points. These boundaries then identify the range of deviation of engine data within which normal engines operate. Of course, normal operating boundaries are not limited to $\pm 3$ standard deviations from the baseline and may be more or less tolerant, depending on the degree of caution desired.

A value is then assigned to the distance measured from the baseline to the normal operating boundary by holding the parameter plotted on the X-axis constant and measuring the deviation in the parameter plotted on the Y-axis from the baseline to either boundary. Then, as instantaneous values of the parameter functions are obtained, they are plotted on the baseline/boundary curve and the distance by which they deviate from the baseline is determined by holding the X-parameter constant and measuring the Y-parameter displacement. This Y-parameter displacement is then the REDD value for the instantaneous function of the X-parameter versus the Y-parameter. The REDD value may be displayed as a positive value, indicating that the instantaneous value of the X-Y parameter fell above the corresponding baseline; a negative value, indicating that the instantaneous value fell below the corresponding baseline; or zero, indicating that the instantaneous value fell directly on the baseline.

Once a REDD value is identified as outside of the normal operating boundaries, the type of degradation occurring in the engine is determined by identifying the component associated with the unusually excessive REDD values. The present invention includes a diagnostic interpretation of the possible deviations observed in the REDD values. The diagnostic chart in Table 1 illustrates the expected relationships between the REDD values

TABLE 1

| FAULT DIAGNOSTIC CAPABILITY | EGT* MARG | NG* MARG | dEGT: NGc | dEGT: Qc | dEGT: FF | dQ: FF | dQ: NGc | dNGc: FF | dCDTr: NGc | dCDPr: NGc | dCDPr: Qc | dCTR: CPR |
|---|---|---|---|---|---|---|---|---|---|---|---|---|
| NORMAL ENGINE** | >+1.0 | >+2.0 | <30 | <25 | <35 | <0.4 | <4 | <1.3 | <0.04 | <0.03 | <0.5 | <0.05 |
| INSTRUMENT ERROR | | | One parameter shows large deviation while others are OK. | | | | | | | | | |
| COMPRESSOR | NEG | <+2 | HI | HI | LO | OK | LO | HI | HI | LO | LO | HI |
| CG TURBINE | NEG | >+2 | HI | OK | HI | OK | HI | LO | OK | OK | HI | OK |
| PT TURBINE | NEG | <+2 | OK | HI | OK | OK | LO | OK | OK | OK | HI | OK |
| AIR LEAK | NEG | <+2 | HI | HI | OK | LO | LO | LO | LO | OK | LO | OK |
| FUEL NOZZLE | | | | | HI | OK | | OK | | HI | | |
| VOLUME | | | | | | | | | | | | |

IGV OFF SCHEDULE  Note: Bleeds, IGV schedule, fuel nozzle volume for fuel flow, and vibration have acceptable conditions specified in the applicable field manuels.
BLEED OFF SCHEDULE Note: Chart values apply when NG is above 88% RPM.
*Negative margin values indicate probable out-of-limits values at max power.
**Zero is the ideal value for a normal engine. The difference can be either Hi (positive) or LO (negative).

| | FM Limit | Equivalent Velocity Limit |
|---|---|---|
| Vibration - GG | 2.5 mils | 3.9 ips max. |
| Vibration - Long | 2.5 mils | 3.9 ips max. |
| Vibration - PT | 3.7 mils | 4.1 ips max. |

PEATS vibration readout is peak velocity in ips.

lines may deviate from the baseline no farther than the established normal operating bands for the engine before maintenance crews must review the engine's fitness to operate. The normal operating bands are obtained empirically by plotting a sample of engine data for a group of, for example 30, newly overhauled engines onto a single sheet and drawing boundaries around the spread of data points. Typically, the normal operating corresponding to various engine faults for a particular model engine.

The REDD values are identified as EGT MARG (exhaust gas temperature margin) NG MARG (gas generator margin), EGT:NGc (exhaust gas temperature versus corrected gas generator speed), EGT:Qc (exhaust gas temperature versus corrected torque pressure), EGT:FF (exhaust gas temperature versus fuel flow), Q:FF (torque pressure versus fuel flow), Q:NGc (torque pressure versus corrected gas generator speed), NGc:FF (corrected gas generator speed versus fuel flow), CDTR:NGc (compressor discharge temperature ratio versus corrected gas generator speed), CDPR:NGc (compressor discharge pressure ratio versus corrected gas generator speed), CDPR:Qc (compressor discharge pressure ratio versus corrected torque pressure), and CDTR:CDPR (compressor discharge pressure ratio versus compressor discharge pressure ratio).

The REDD values ordinarily will not change from their original performance tolerances unless some internal change in the engine causes it to do so. Thus, a change in any REDD value is indicative of some engine deterioration. Some deviation is expected as the engine begins to degrade due to component wear, contamination and misadjustment. The deviations allowed for a particular model engine, i.e. the ± boundary lines from the baseline, are shown in Table 1 below. For example, the top line of Table 1 indicates that the absolute REDD value for a normal engine of the particular model illustrated for the function of exhaust gas temperature (EGT) versus corrected gas generator speed (NGc) is less than 30. In Table 1, the REDD values are given as absolute values and the directions of deviation are provided as either "HI" (above the baseline) or "LO" (below the baseline).

Probable causes of engine failure are indicated down the left column of Table 1 when REDD values exceed the normal engine values with the indicated value for the particular fault given by either HI (positive REDD) or LO (negative REDD). The HI and LO indicators are additional diagnostic features of the present invention which correspond to the effect of the shift in REDD value above or below the corresponding baseline. Engine parameter relationships will deviate in particular and predictable directions above or below the corresponding baseline depending on the type of engine degradation causing the deviation of the actual parameter formation from the predetermined baselines. The present invention utilizes this unique feature in performing probable engine fault diagnosis. Each particular engine fault can thus be described by characteristically excessive REDD values and the direction of deviation of the REDD value from the normal baseline. The present invention identifies the probable engine faults by comparing the REDD values and their direction of deviation with the characteristic values for the particular engine faults as illustrated in Table 1 and provides these diagnostic values in a single, easily understandable readout. The characteristic values and deviation directions with respect to each REDD value are predetermined through testing and analysis of new and failing engines.

Table 2 shows a printout taken on an engine in good condition. In the left column, instantaneous values of the individual engine parameters are listed. In the middle column, engine parameters corrected to standard atmospheric conditions, engine margins and bleed valve position are displayed. Finally, a selection of REDD values is displayed, in the right column, for the engine diagnosis. The "d" in the REDD data in the right column indicates that the REDD values are measurements of the deviation in the first listed parameter while holding the second listed parameter constant. Thus, for example, the first REDD value line in the right column indicates that the deviation in the exhaust gas temperature over the baseline is one degree celsius above the baseline at the constant, corrected gas generator speed value.

For the case illustrated in Table 2, the absolute values of all the REDD values shown are within the specifications for the normal engine indicated in the top line of the diagnostic chart for the particular engine model shown in Table 1. Diagnostic checks on engine performance can be made as quickly as comparing the REDD values indicated in this column with the normal engine REDD values indicated in the top column of Table 1 for the particular model engine. Diagnostic checks can thus be made by the aircrew while in flight and by low skill maintenance personnel rather than highly skilled diagnostic experts.

TABLE 2
EXEMPLARY REDD PRINTOUT SHOWING ENGINE IN GOOD CONDITION

| PARAMETER NAME | | INDICATED | CORRECTED | REFERRED DIAGNOSTIC | | VALUES NORMAL | ACTUAL |
| --- | --- | --- | --- | --- | --- | --- | --- |
| NG | (percent) | 100.02 | 97.9 | dEGT:NGc | (deg C.) | <30 | +1 |
| EGT | (deg C.) | 582 | 560 | dEGT:Qc | (deg C.) | <25 | +1 |
| FF | (pph) | 613 | 737 | dEGT:FF | (deg C.) | <35 | −3 |
| Q | (psi) | 39.7 | 48.2 | dQ:FF | (psig) | <3 | −0.3 |
| Npt | (rpm) | 6620 | | dQ:NGc | (psig) | <0.4 | −0.1 |
| CDP | (psia) | 75.6 | | dNGc:FF | (percent) | <1.3 | +0.9 |
| CDT | (deg C.) | 300 | | dCDTr:NGc | | <0.04 | −0.001 |
| CDPR | | 6.309 | MARGINS | dCDPr:NGc | | <0.3 | −0.287 |
| FP | (psia) | 169.7 | EGT > +1.0 | dCDPr:Qc | | <0.5 | −0.280 |
| FF/FP | (min/max) | 164/234 | NG > +2.0 2.1 | dCTR:CPR | | <0.05 | +0.033 |
| IGV | (degrees) | −5.0 | BV - Closed | | | | |

For example, maintenance personnel can quickly pinpoint compressor deterioration on the engine having the diagnosis shown on Table 3, below. The absolute REDD values for compressor discharge temperature ratio (CDTR) versus corrected gas generator speed (Ngc), compressor discharge pressure ratio (CDPR) versus corrected gas generator speed (Ngc), compressor discharge pressure ratio (CDPR) versus corrected torque (Qc), and compressor discharge temperature ratio (CTR) versus compressor discharge pressure ratio (CPR) are all outside of the normal engine band for those parameters shown as absolute values in the top line of Table 1. The REDD value for the monitored engine for compressor discharge temperature ratio (CDTR) versus corrected gas generator speed (Ngc) is positive 0.250. The normal REDD band for this particular model engine is less than 0.04 as recorded in Table 1. The actual value of CDTR versus Ngc for this particular engine thus exceeds the tolerance level allowable for a normal engine. Compressor discharge pressure ratio (CDPR) versus corrected gas generator speed (Ngc), compressor discharge pressure ratio (CDPR) versus corrected torque (Qc), and compressor discharge temperature ratio (CTR) versus compressor discharge pressure ratio (CPR) are also outside the normal engine band limits.

The REDD values for compressor discharge pressure ratio (CDPR) versus corrected gas generator speed (NGc) and for compressor discharge pressure ratio (CDPR) versus corrected torque (Qc) are negative indicating that the deviation in these performance parameters was below the corresponding normal baseline curve. The REDD values for compressor discharge greater than +2.0, respectively, for normal engine condition. The diagnostic analyzer thus continually monitors the extent and location of turbine engine deterioration and produces REDD values which correspond to the extent and location of the deterioration. By comparing outputted REDD values with predetermined normal REDD values, the pilot and maintenance personnel can quickly and continually determine the engine performance condition.

The development and use of the baselines are illus-

TABLE 3
EXEMPLARY REDD PRINTOUT SHOWING ENGINE WITH COMPRESSOR DETERIORATION

| PARAMETER NAME | INDICATED | CORRECTED | REFERRED DIAGNOSTIC | VALUES NORMAL | ACTUAL |
|---|---|---|---|---|---|
| NG (percent) | 100.02 | 98.2 | dEGT:NGc (degC) | <30 | −12 |
| EGT (degC) | 598 | 549 | dEGT:Qc (degC) | <25 | −2 |
| FF (pph) | 709 | 726 | dEGT:FF (degC) | <35 | −3 |
| Q (psi) | 46.1 | 46 | dQ:FF (psig) | <3 | −0.3 |
| Npt (rpm) | 6372 | | dQ:NGc (psig) | <0.4 | −3.4 |
| CDP (psia) | 85.6 | | dNGc:FF (percent) | <1.3 | +0.9 |
| CDT (degC) | 385 | | dCDTr:NGc | <0.04 | +0.250 |
| CDPR | 6.144 | MARGINS | dCDPr:NGc | <0.3 | −0.504 |
| FP (psia) | 229.1 | EGT <+1  53 | dCDPr:Qc | <0.5 | −0.327 |
| FF/FP (min/max) | 213/291 | NG  >+2.0 1.1 | dCTR:CPR | <0.05 | +0.303 |
| IGV (degrees) | −11.5 | BV       Closed | | | | temperature ratio (CDTR) versus corrected gas generator speed (Ngc) and for compressor discharge temperature ratio (CTR) versus compressor discharge pressure ratio (CPR) are positive and thus deviate above the corresponding normal baseline. Looking then to Table 1, the combination of "LO" (negative) CDPR versus NGc, "HI" (positive) CDTR versus Ngc, "LO" CDPR versus Qc , and "HI" CDTR versus CDPR, appears only in the "compressor" row indicating that the diagnostic fault is probably located within the compressor. In fact, when this engine was broken down, compressor deterioration was confirmed. The excessive REDD values thus alert the aircrews and maintenance personnel to possible degradation in the engine performance and provide a diagnosis of probable engine faults.

The diagnostic values used by the present diagnostic analyzer also include gas generator speed (Ng) margins and exhaust gas temperature (EGT) margins. Margins may be calculated by the diagnostic system as the difference between an engine performance parameter and the cockpit operational limit for that parameter at rated engine output. Thus, for example, the EGT margin of 53 and the Ng margin of 1.1 in Table 3 indicate that the exhaust gas temperature is currently 53° C. less than the redline value at maximum rated power, and that the gas generator speed is 1.1% less than the redline value at maximum rated power. Rather than independently calculate the margins, the diagnostic system may be used with the PEATS, manufactured by Howell Instruments, Inc., Fort Worth, Texas, which provides EGT and Ng margins on its outputs.

The effects on gas path performance for problems displayed by negatively deviant EGT margins are also characteristic of particular engine failures. Table 1 illustrates the relationships between the deviant EGT margin's effect and the probable engine faults related to the deviations. NG margins above or below the 2 threshold are also indicative of particular engine failures identified in Table 3. The present apparatus thus uses the Ng and EGT margins for diagnostic value as additional indicators of engine performance condition. For the particular engine modeled in Table 1, for example, the EGT and NG margins should operate within greater than +1 and trated in the flow charts of FIGS. 4 and 5. A sample of parameter values is initially required to develop the baselines for the diagnosis. A large sample may be obtained from sources including: test cell data for a particular engine 200, inflight data on installed engines 202, and maximum power maintenance tests (such as the known Turbine Engine Analysis Check - TEACS) 204. For example, the test cell data is a sample of parameter data which is acquired on a newly built or rebuilt engine under uninstalled, controlled conditions. The inflight data is a sample of data obtained during routine operation of the aircraft and may be acquired by any inflight data recorder. Finally, known maintenance tests such as TEACS may be used to obtain sampling data. TEACS provides recorded data on an installed engine operating at the maximum rated power.

Figure 4:
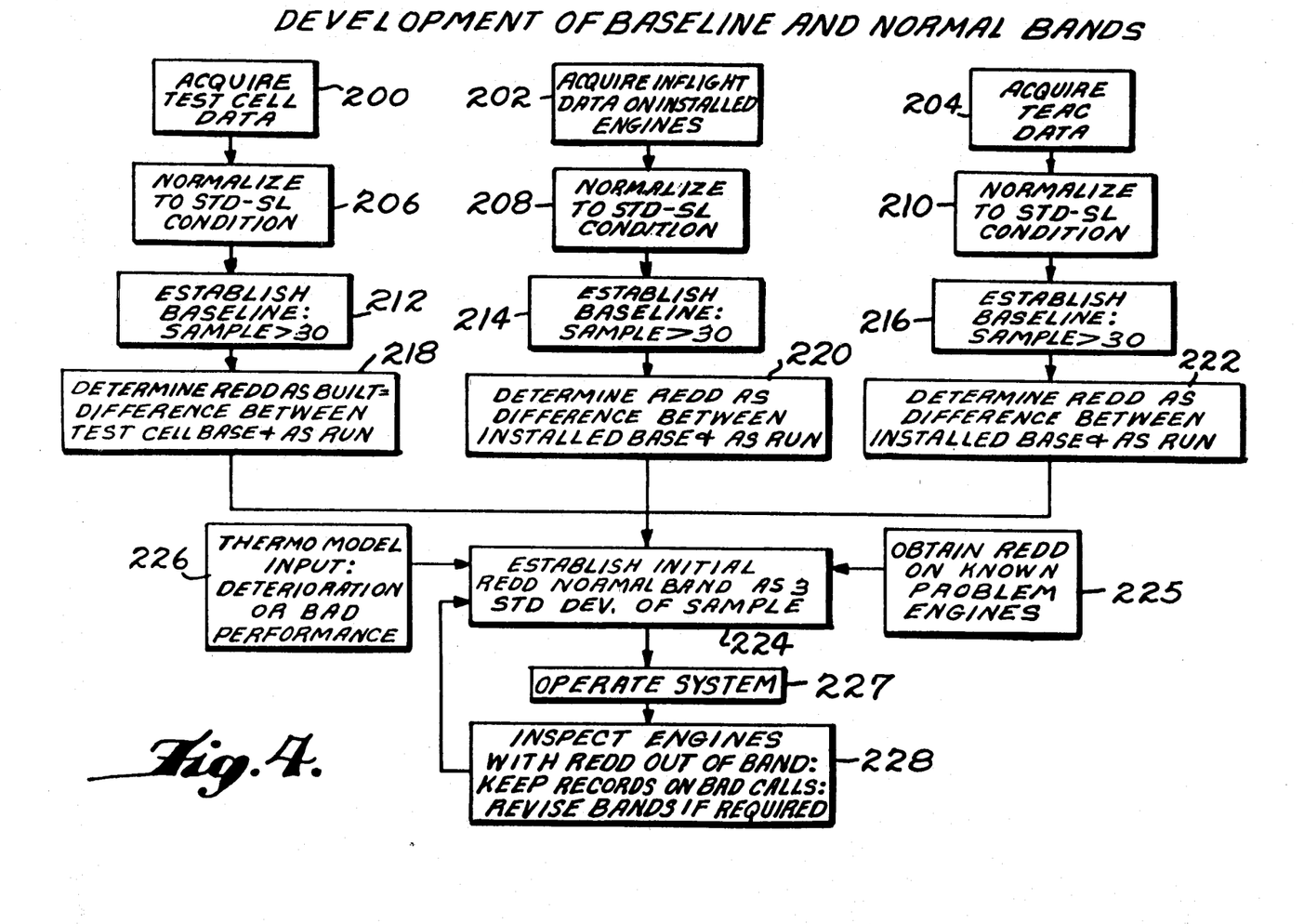
FIG. 4 is a flow chart illustrating the method of obtaining the REDD baselines.

The sampled data is first normalized to standard, sea level conditions at 206, 208, and 210. Then, by plotting each sample of parameter values as functions of the other parameter values, a baseline may be obtained for test cell 212, inflight 214 and TEAC data 216, like that illustrated in FIG. 3. A set of REDD values may then be obtained, at steps 218, 220 and 222, for each baseline by plotting the instantaneous values of the parameters onto the respective baseline chart, holding the X-value constant, and measuring the displacement of the Y-value from the baseline.

The test cell REDD and TEAC REDD will be used at a later step to reevaluate the operating bands. The inflight REDD will be compared to a normal operating band to determine current engine condition. At step 224, preliminary normal operating bands may be established at, for example, plus or minus three times the standard deviation of the sample. If any REDD data is available for known problem engines of the same model as the currently monitored engine, the known REDD values should also be plotted with the inflight samples to accurately determine the bandwidth necessary for the degree of precaution desired at step 225. Thermodynamic models of the turbine engine may also be used in the determination of the allowable band tolerance for the particular engine at step 226. The limit may also be preliminarily determined based on previously known REDD values for known problem engines of the particular model as the currently monitored engine. The engine is then operated at step 227 and, as the engine deteriorates out of REDD limits, the engine may be inspected to identify the cause and extent of deterioration to revise the band values at 228.

Figure 5:
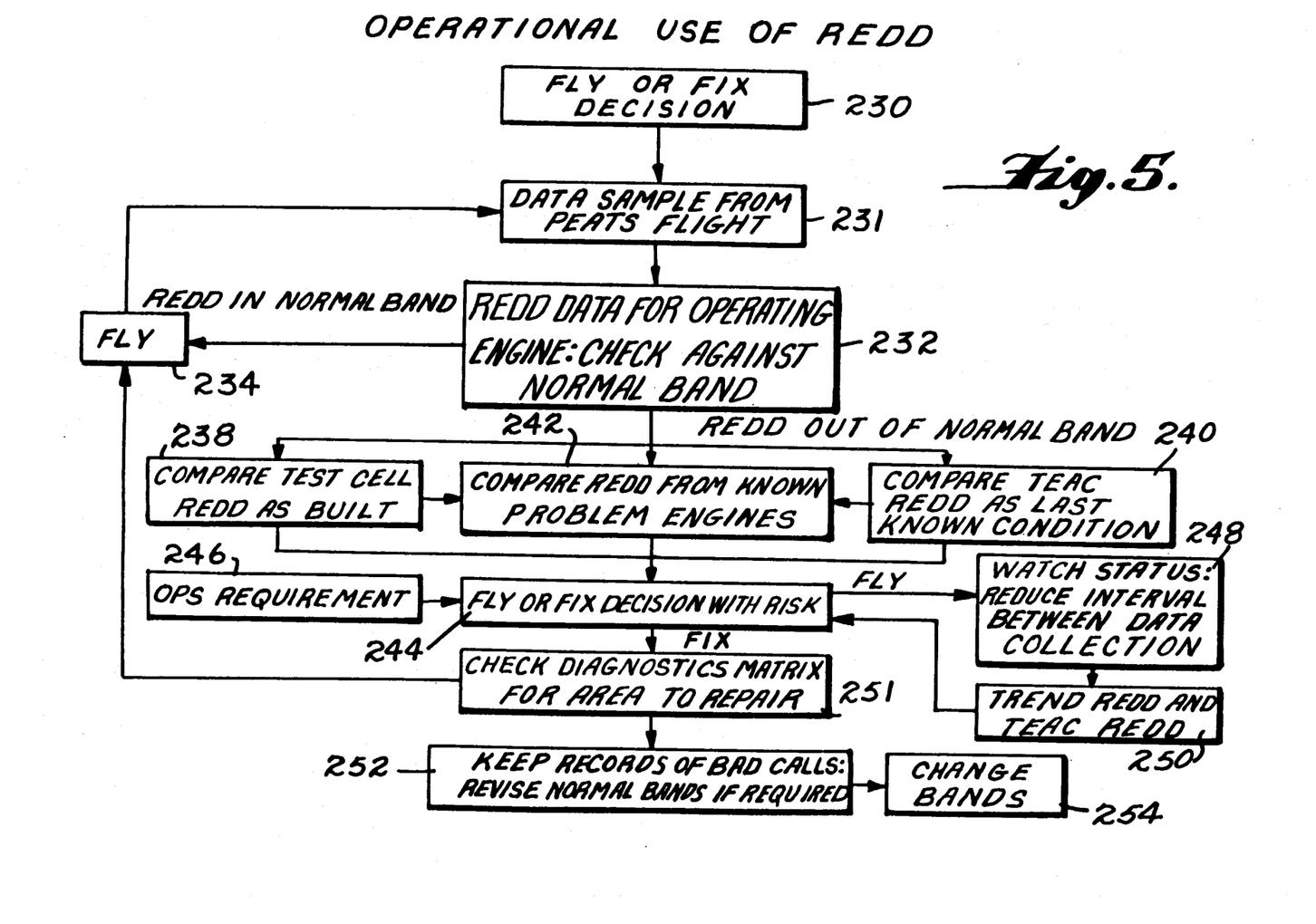
FIG. 5 is a flow chart illustrating the use of REDD baselines.

Referring now to FIG. 5, an initial fly or fix decision is made at step 230 and a current data sample of instantaneous engine performance parameters 231 is then obtained from, for example, the PEATS. The parameters are then plotted as functional points on the baseline/boundary curves, an example of which is shown in FIG. 3. The location of the current operating point, as plotted in FIG. 3, is then compared with the location of the baseline to determine whether the engine is currently running within the normal operating band values at step 232. If the current data operating point is within the bandwidth, the decision that the engine is condition to fly is made at 234. If, on the other hand, the data falls outside the bandwidth, the decision that the engine is not in condition to fly is made.

A decision on the operability of the out-of-limit engine must then be made. By comparing the REDDs for that engine as it ran on the test cell data 238, identifying the "as built" engine condition; the TEAC data 240, identifying the last known maximum power engine condition; and the inflight data 242, identifying the current problem engine condition, the risk in "flying or fixing" 244 may be evaluated. The proximity of the current data to the "as built" and last known "maximum power" data will be critical to the fly or fix determination in light of the degree of precaution desired. In addition, OPS requirements 246, identifying the degree of precaution desired, must be factored into the fly or fix decision. For example, military OPS requirements will dictate when particular situations will warrant the exercise of maximum and minimum precautions.

If the decision is made to "fly" despite the REDD values exceeding the normal operating baselines, the intervals between data collection may be reduced as a precautionary measure 248 and the decision to continue flying may be periodically reevaluated 250 in light of the trends of the deviation of the REDD values from the baseline over time. If the decision at 244 is made to "fix", the engine is disassembled and inspected to determine and repair the abnormality. The probable cause of engine deterioration may be identified by comparing the out-of-limit REDD values and their direction of deviation (HI or LO) with the diagnostic chart in Table 1 at step 251. Records of bad calls should be kept at step 252 and the preliminary normal operating band of "three times the standard deviation" may be adjusted at step 254, as necessary, to coordinate the actual condition of the problem engine with the normal operating band for the diagnosis.

The applicant has described the invention in connection with what the applicant considers to be the most practical and preferred embodiment, the applicant does not intend the invention to be limited to the disclosed embodiment but, on the contrary, intends the invention to cover various modifications and equivalent arrangements included within the spirit and scope of the appended claims.

What is claimed is:

1. A turbine engine diagnostic reference system for use with a turbine engine having performance related parameters and being subject to a plurality of causes of engine deterioration, comprising:

sensing means, located at operable positions of said turbine engine, for detecting the engine performance related parameters; and processing means, electrically connected to said sensing means, for: (1) recording each sensed parameter as an actual function of another sensed parameter, (2) comparing the actual functions with predetermined standard baselines, (3) calculating deviations between the actual functions and the standard baselines, (4) comparing the deviations to predetermined normal deviations; and (5) outputting results of said comparisons;

indicating means for receiving from said processing means the performance related parameters and the results of said comparisons and for indicating the performance-related parameters and the results of said comparisons; and diagnostic means for receiving from said processing means the results of said comparisons and for indicating particular causes of engine deterioration indicative of said comparisons.

2. A reference system as in claim 1 wherein the turbine engines have a gas path and the sensing means detects engine performance related parameters within the gas path of each engine.

3. A reference system as in claim 2 wherein the processing means also calculates the deviation as a function of the direction of deviation from the standard baseline, the indicating means also providing an indication of said condition as a result of said direction of deviation.

4. A reference system as in claim 1 wherein the sensing means includes at least two of: an exhaust gas temperature sensor, gas generator speed sensor, fuel flow sensor, compressor discharge pressure sensor, compressor discharge temperature sensor, torque pressure sensor, fuel pressure sensor, and specific fuel consumption sensor.

5. A reference system as in claim I wherein said processing means also refers preselected engine performance related parameters to standard atmospheric conditions.

6. A reference system as in claim 5 wherein the means for correcting includes a set of environmental sensors to detect at least, pressure altitude and ambient temperature.

7. A reference system according to claim 5 wherein the sensing means includes an exhaust gas temperature sensor and gas generator speed sensor, and wherein said processing means records the instantaneous values of said exhaust gas temperature sensor as functions of the corrected, instantaneous values of said gas generator speed sensor.

8. A reference system according to claim 5 wherein the sensing means includes a fuel flow sensor and gas generator speed sensor, and wherein said processing means records the instantaneous values of said fuel flow sensor as functions of the corrected, instantaneous values of said gas generator speed sensor.

9. A reference system according to claim 5 wherein the sensing means includes a compressor discharge pressure sensor and gas generator speed sensor, and wherein said processing means records the corrected, instantaneous values of said compressor discharge pressure sensor as functions of the corrected, instantaneous values of said gas generator speed sensor.

10. A reference system according to claim 5 wherein the sensing means includes a compressor discharge temperature sensor and gas generator speed sensor, and wherein said processing means records the corrected, instantaneous values of said compressor discharge temperature sensor as functions of the corrected, instantaneous values of said gas generator speed sensor.

11. A reference system according to claim 5 wherein the sensing means includes a torque pressure sensor and gas generator speed sensor, and wherein said processing means records the instantaneous values of said torque pressure sensor as functions of the corrected, instantaneous values of said gas generator speed sensor.

12. A reference system according to claim 5 wherein the sensing means includes a exhaust gas temperature sensor and torque pressure sensor, and wherein said processing means records the instantaneous values of said exhaust gas temperature sensor as functions of the corrected, instantaneous values of said torque pressure sensor.

13. A reference system according to claim 5 wherein the sensing means includes a compressor discharge pressure sensor and torque pressure sensor, and wherein said processing means records the instantaneous values of said compressor discharge pressure sensor as functions of the corrected, instantaneous values of said torque pressure sensor.

14. A reference system according to claim 5 wherein the sensing means includes a fuel pressure sensor and fuel flow sensor, and wherein said processing means records the instantaneous values of said fuel pressure sensor as functions of the instantaneous values of said fuel flow sensor.

15. A reference system according to claim 5 wherein the sensing means includes a fuel flow sensor and exhaust gas temperature sensor, and wherein said processing means records the instantaneous values of said fuel flow sensor as functions of the instantaneous values of said exhaust gas temperature sensor.

16. A reference system according to claim 5 wherein the sensing means includes a specific fuel consumption sensor and gas generator speed sensor, and wherein said processing means records the instantaneous values of said specific fuel consumption sensor as functions of the corrected, instantaneous values of said gas generator speed sensor.

17. A reference system according to claim 5 wherein the sensing means includes a fuel flow sensor and torque pressure sensor, and wherein said processing means records the instantaneous values of said fuel flow sensor as functions of the corrected, instantaneous values of said torque pressure sensor.

18. A reference system as in claim 1 wherein the engine performance parameters include gas generator speed margin and exhaust gas temperature margin;
the processing means also for comparing the margins with predetermined standard margins and calculating the deviation between the actual margins and the standard margins;
the indicating means also providing an indication of said condition as a result of said calculation of said margin deviation.

19. A reference system as in claim 1 wherein the indicating means includes display means for instantaneously indicating values of the engine performance related data and the calculated deviations.

20. A reference system as in claim 19 wherein the indicating means further includes printing means for instantaneously recording the sensed engine performance related parameters and the deviations for each engine.

21. A reference system as in claim 1 further including means for recording performance related parameters for a plurality of engines.

22. A method for troubleshooting and diagnosing turbine engines having performance related parameters and being subject to a plurality of causes of engine deterioration, comprising the steps of:
sensing engine performance related parameter at operable positions of said turbine engine;
recording each engine performance related parameter as an actual function of another engine performance related parameter;
comparing the actual functions with predetermined standard baselines;
calculating deviations between the actual functions and the standard baselines;
comparing the deviations to predetermined standard deviations;
providing an indication of the performance related parameters and the results of said comparisons;
evaluating particular causes of engine deterioration in said turbine engine indicative of said comparisons; and
providing an indication of said particular causes of engine deterioration.

23. A method as in claim 22 further including, after the sensing step, a step of correcting the engine performance related parameters to standard atmospheric conditions.

24. A method as in claim 22 wherein the step of providing an indication of said turbine engine condition includes a step of instantaneously displaying the engine performance related data values and the calculated deviation values.

25. A method as in claim 24 wherein the step of providing an indication of said turbine engine condition further includes a step of instantaneously printing the engine performance related data values and the calculated deviation values.

26. A method for troubleshooting and diagnosing a turbine engine having performance related parameters and being subject to a plurality of causes of engine deterioration, comprising the steps of:
sensing the engine performance related parameters at operable positions of said turbine engine;
recording each sensed parameter as an actual function of another sensed parameter;
comparing the actual functions with predetermined standard baselines;
calculating and displaying referred engine diagnostic data (REDD) between the actual functions and the standard baselines;
comparing the REDD to predetermined normal deviations;
providing an indication of the directions of deviation of the actual functions from the standard baselines;
providing an indication of the performance related parameters, the results of said comparisons, and the directions of deviation;
evaluating particular causes of engine deterioration in said turbine engine indicative of said comparisons and said directions of deviation; and
providing an indication of said particular causes of engine deterioration.

27. A method as in claim 26 wherein the step of providing an indication includes the step of instantaneously displaying at least one of the engine performance related data values, the calculated deviations, and the directions of deviation.

28. A method as in claim 26 wherein the step of providing an indication includes the step of instantaneously printing at least one of the engine performance related data values, the calculated deviations, and the directions of deviation.

29. A method according to claim 26, further including, during the step of sensing, the step of operating the engine at less than maximum rated power.

* * * * *